Nov. 25, 1958 — W. R. WEEKS — 2,861,513
AUTOMATIC TOASTER
Filed Jan. 23, 1957 — 4 Sheets-Sheet 1

Inventor:
Walter R. Weeks.
by Armand Cifelli
His Attorney.

Nov. 25, 1958     W. R. WEEKS     2,861,513
AUTOMATIC TOASTER
Filed Jan. 23, 1957     4 Sheets-Sheet 2
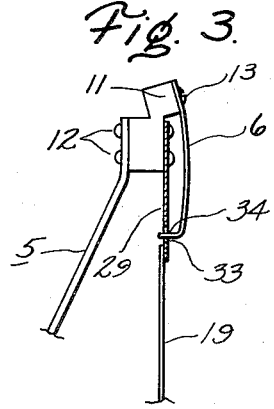
Fig. 3.
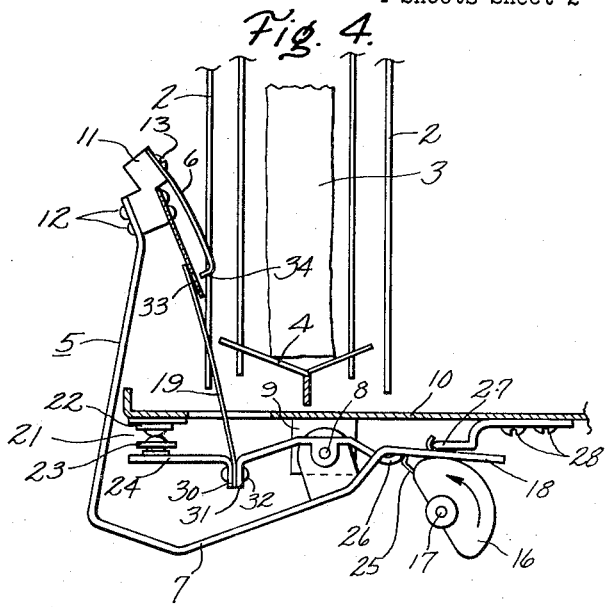
Fig. 4.
Fig. 5.
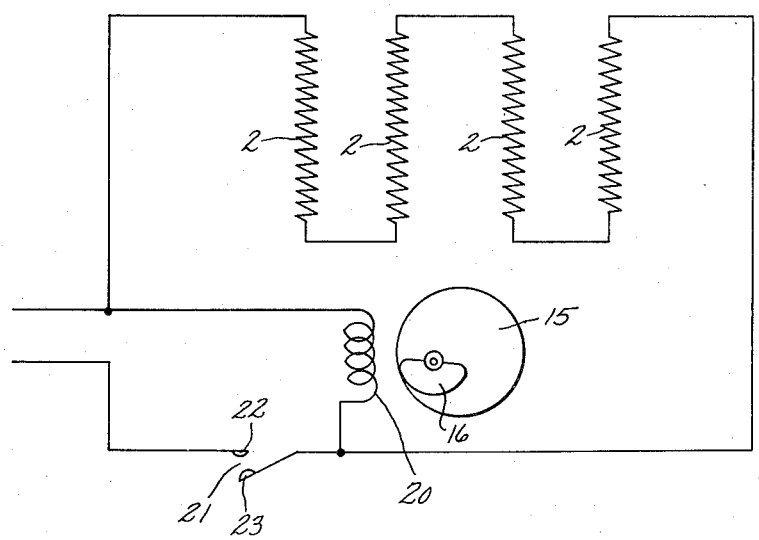
Inventor:
Walter R. Weeks
by Armand Cifelli
His Attorney Nov. 25, 1958 — W. R. WEEKS — 2,861,513
AUTOMATIC TOASTER
Filed Jan. 23, 1957 — 4 Sheets-Sheet 3

Inventor:
Walter R. Weeks
by Armand Cifelli
His Attorney

Nov. 25, 1958
W. R. WEEKS
2,861,513
AUTOMATIC TOASTER
Filed Jan. 23, 1957
4 Sheets-Sheet 4
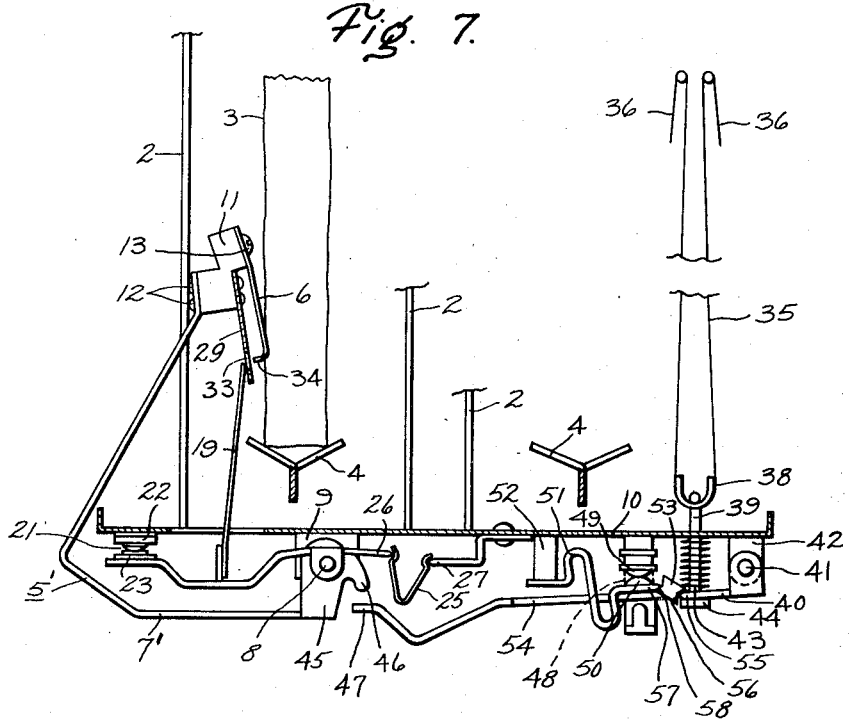
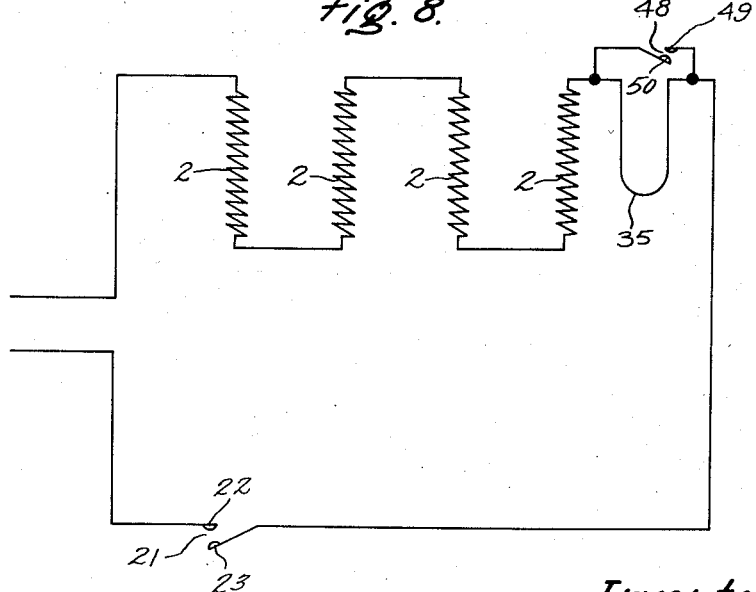
Inventor:
Walter R. Weeks
by Armand Cifelli
His Attorney

United States Patent Office 2,861,513
Patented Nov. 25, 1958

2,861,513
AUTOMATIC TOASTER

Walter R. Weeks, Louisville, Ky., assignor to General Electric Company, a corporation of New York Application January 23, 1957, Serial No. 635,728

17 Claims. (Cl. 99—331)

My invention relates to toasters and more particularly to automatic toasters.

It has been found that the temperature of the surface of a piece of bread being toasted bears a definite relation to the "doneness" of the bread, which is normally referred to as the color of the toast. Accordingly, one way to obtain automatically, toast of a desired color is to provide some means to sense with reasonable accuracy the temperature of the surface of the bread. A number of different arrangements have been proposed for providing elements responsive to the bread surface temperature for controlling the toasting operation. Many such devices had a deficiency in that being positioned against the surface of bread to sense the temperature, they were also materially affected by the heat from the heating elements employed to effect the toasting operation, leading to inaccurate control of toast color. By my invention, the temperature of the surface of the bread is accurately sensed in order to control the toasting operation and provide toast of the desired color, and the effect of heat from the heating elements is minimized. Thus I have provided an improved arrangement whereby a sensing element is periodically moved into engagement with the bread slice for sensing the temperature thereof, but, during the major portion of the toasting operation, it is maintained away from the bread slice and in a position substantially unaffected by the heat from the heating elements performing the toasting operation. Also, this sensing element does not prevent heat from reaching all of the toast surface. I am thus enabled to obtain even toasting and an accurate control of toast color by means of the sensing element which is periodically brought into engagement with the bread slice and allowed to remain in such engagement only a sufficient length of time to reach the temperature of the surface of the bread slice.

It is an object of my invention to provide an improved arrangement for automatically controlling the toasting of the bread slice.

It is another object of my invention to provide improved means for periodically testing the surface temperature of a bread slice being toasted.

It is a further object of my invention to provide an improved temperature control for an automatic toaster which is responsive to the surface temperature of the bread.

It is still another object of my invention to provide an improved arrangement for periodically sensing the temperature of the surface of the bread slice and interrupting the toasting operation when this temperature has reached a predetermined value.

Further objects and advantages of my invention will become apparent as the following description proceeds and the features of novelty which characterize my invention will be pointed out with particularity in the claims annexed to and forming part of this specification.

In carrying out the objects of my invention in one form thereof, I have provided a temperature-responsive element which is normally kept away from the surface of the bread slice and shielded from the heating means. The temperature-responsive element is oscillated periodically into and out of temperature-sensing relation with the surface of the bread slice. It is held in the former position a sufficient length of time to be brought approximately to the temperature of the bread surface. Finally, I provide an arrangement whereby the temperature-responsive element, upon reaching the proper temperature for terminating the toasting operation, is caused, upon return movement out of engagement with the bread slice, to effect actuation of a switch or latch for terminating the toasting operation.

For a better understanding of my invention, reference may be had to the accompanying drawings in which—

Fig. 3 is a view of the portion of the mechanism shown in Fig. 2, illustrating the temperature-responsive element in the position it occupies after the bread surface has reached the desired temperature.

Fig. 4 is a view of a portion of the structure shown in Fig. 2, illustrating the relationship of the parts upon movement of the temperature-responsive element away from the bread slice at an intermediate stage of the toasting operation.

Fig. 5 is a schematic diagram of the electrical circuit employed with the toaster.

Fig. 7 is a view similar to Fig. 6, showing the parts in a different position.

Fig. 8 is a schematic diagram of the electrical circuit of this modified form of my invention.

Figure 1:
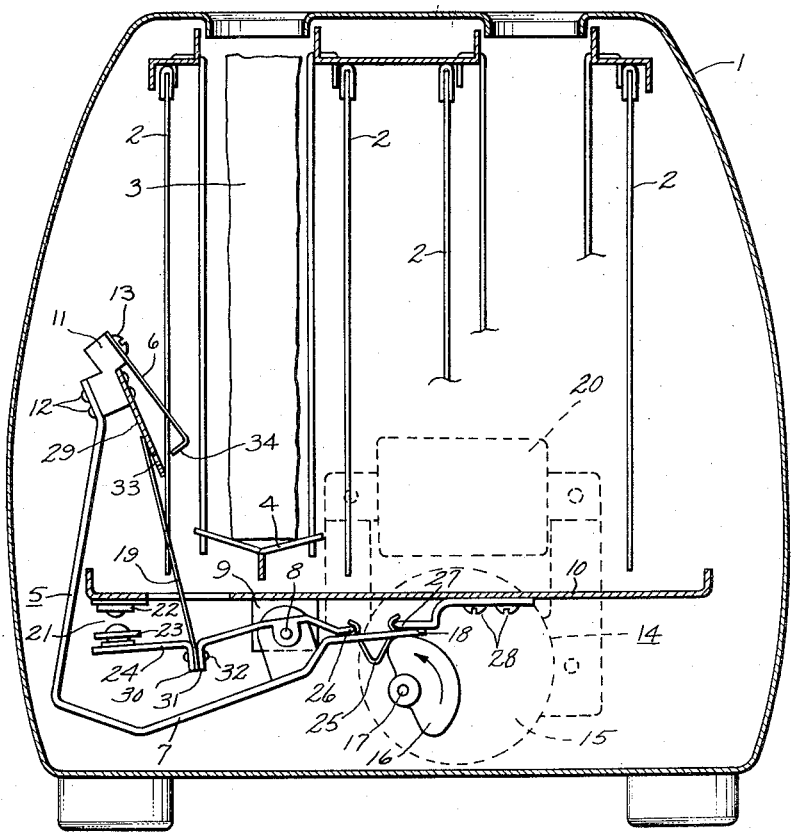
Fig. 1 is a sectional elevation view of a toaster incorporating one embodiment of my invention, showing the parts in the position they occupy just prior to the beginning of the toasting operation.

Referring now to the drawing, there is shown a toaster housing 1 containing spaced electric heating elements 2 for toasting the bread slices. Each of the bread slices 3 is shown arranged between a pair of the heating elements 2. The bread slices are supported on a carriage, a portion of which is shown at 4, and the carriage may be moved downwardly in any conventional manner to bring the bread slices into the toasting position. Power is supplied from any suitable power source to the electric heating elements 2 to supply heat for toasting the bread slices.

In order to provide an automatic toasting operation, it is necessary to provide for automatically terminating the toasting operation when the bread has reached the color desired by the user. It is known that the color of the toast is related to the surface temperature thereof. Accordingly, I have provided an improved arrangement for accurately sensing the temperature of the bread surface and utilizing this information for terminating the toasting operation when this bread surface temperature has reached the desired value.

More specifically, as shown in the drawings, I have provided a structure which includes a temperature-testing means for periodically sensing the temperature of the bread surface. This temperature-testing means is illustrated generally at 5 and includes a temperature-responsive element 6. The temperature-responsive element, in the form illustrated, comprises a bimetallic strip, mounted as a cantilever.

In order to provide for periodic movement of the temperature-responsive element into engagement with the bread slice for sensing the temperature thereof, a portion of one of the heating elements 2 (the left-hand one in the drawings) is cut away and the temperature-testing means includes a pivotal lever 7. This lever is pivotally mounted at 8 on a bracket 9 depending from a support 10 within the toaster structure. A block 11 of heat-insulating material is mounted on the free end of the pivoted lever 7 by means of rivets 12 or other suitable fastening devices. The temperature-responsive element 6 is secured to the heat-insulating block 11 by means of a screw 13 or other suitable fastening device. As the pivoted lever is oscillated, the temperature-responsive element is moved between the position shown in Fig. 4, where it is out of engagement with the bread slice and substantially unaffected by the heat from the heating element, and the position shown in Fig. 2, where it is in engagement with the surface of the bread slice and thereby senses the temperature thereof.

In order to effect such periodic movement of the temperature-testing means, including the pivoted lever 7, I provide a mechanism generally indicated at 14. This mechanism includes a motor 15 and a cam 16 driven by the motor. The cam is mounted on a shaft 17 extending from the casing of the motor 15 and is driven in a counterclockwise direction, as indicated by the arrow. The cam 16 engages one end of lever 7, the lever being bent at this end to form a cam follower 18. As the shaft 17 of the motor rotates it carries the cam 16 into engagement with the cam follower to move the pivoted lever 7 to the counterclockwise position shown in Fig. 4. As the cam continues to rotate, it allows the pivoted lever to move in a clockwise direction under the bias of a leaf spring or member 19. In this way the temperature-sensing mechanism and more specifically the bimetal strip 6 is moved perodically into engagement with the surface of the bread slice and is allowed to remain there through a short interval sufficient to insure that the bimetallic strip reaches approximately the temperature of the surface of the bread slice. The temperature-sensitive mechanism is then moved to its retracted position.

In order to supply power for driving the motor 15, the winding 20 of the motor is connected in the circuit, as illustrated in Fig. 5, in parallel with the electric heating elements 2.

In order to effect energization of the electric circuit of the toaster, including the electric heating elements 2, a switch 21 is provided. The switch includes a stationary contact 22 which is mounted on the support 10 and a movable contact 23. The movable contact 23 is mounted on one end of a switch arm 24 which is also pivoted at 8 on the bracket 9. In order to effect snap-action movement of the switch 21 between open and closed positions, an overcenter spring 25 is provided between one end 26 of the switch arm 24 and a bracket 27. The bracket 27 is mounted on the support 10 by means of screws 28 or other suitable fastening devices. The switch 21 is shown in its open position in Fig. 1. It may be moved to its closed position by any suitable manual or other means (not shown) for effecting initiation of the toasting operation.

The control structure of my invention includes means for automatically effecting opening of the switch 21 and termination of the toasting operation when the surface of the bread reaches the desired temperature. In order to effect such control an elongated strip or member 29 of relatively rigid material is mounted on the heat insulating block 11 and extends downwardly therefrom. This member 29 may be supported, if desired, by means of the rivets 12. In the form illustrated, the switch arm 24 is made in two parts including adjacent depending legs 30, 31. The two parts of the switch arm are connected together by a rivet 32 or other suitable fastening means extending between the adjacent legs. The lower end of the elongated leaf spring 19 is mounted between the aforementioned adjacent legs 30, 31 by means of the rivet 32.

The leaf spring 19, therefore, extends upwardly from the switch arm 24, generally in line with the member 29. An opening 33 is provided in the strip 29 near its lower end. The relationship of the members 19 and 29 is such that the upper end of the member 19 terminates short of the opening 33 when the temperature-testing means occupies the position shown in Fig. 2 wherein the temperature-responsive element is in engagement with the surface of the bread slice. As the temperature-testing means is moved toward the position shown in Fig. 4, the upper end of the member 19 normally passes over the opening 33.

Figure 2:
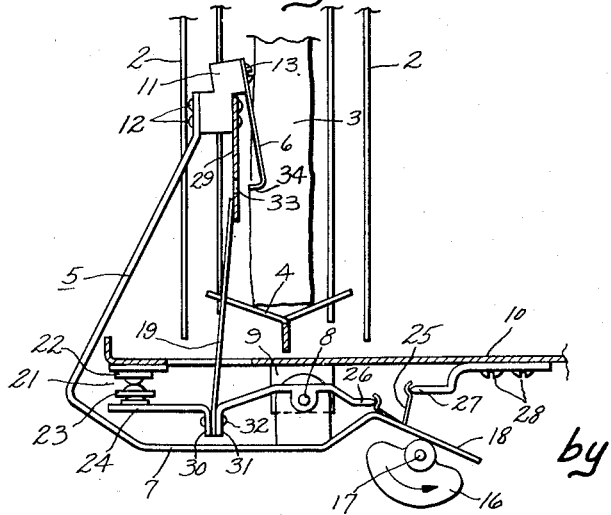
Fig. 2 is a similar view showing the position of the parts when the temperature of the bread surface is being sensed.

So long as the temperature of the bread surface is below the predetermined desired temperature, the member 19 is free to move beyond the opening 33 during the oscillation of the temperature-testing means. In order to effect termination of the toasting operation, however, the mechanism is constructed so that the temperature-responsive element 6 blocks relative movement of the members 19 and 29 when the temperature-testing means is being retracted after the temperature of the bread surface has reached the predetermined value. Thus, the temperature-responsive element 6 is made in an L shape and includes a leg 34 which is generally perpendicular to the major portion of the bimetallic strip 6 and is arranged in alignment with the opening 33. So long as the temperature of the bread surface is below the predetermined value, the temperature-responsive element 6, after it leaves the bread surface subsequent to having been in contact therewith, occupies a position wherein the leg 34 thereof does not project through the opening 33, as shown for example in Figs. 1, 2 and 4. However, when the bread surface reaches the predetermined temperature, after having been in contact with the bread surface, the bimetallic strip 6 asssumes the position shown in Fig. 3 wherein the leg 34 thereof projects through the opening 33 and into the path of the upper end of the leaf spring 19. Under such circumstances, as the temperature-testing means is moved from the position shown in Fig. 2 toward that shown in Fig. 4 in accordance with its normal periodic oscillation, the usual relative movement of the members 19 and 29, illustrated by comparison of Figs. 2 and 4, is prevented by the engagement of the upper end of the leaf spring 19 with the leg 34 of the bimetallic strip 6. As the pivoted lever 7 continues to be urged in a counterclockwise direction by the rotation of the cam 16, the aforementioned blocking action causes a relative downward movement of the leaf spring 19. This movement of the leaf spring 19, through its aforementioned connection with the switch arm 24, effects a counterclockwise pivoting of the switch arm 24 to its overcenter position, opening the switch 28 and terminating the toasting operation.

The spring 25 is sufficiently strong to hold the switch 21 closed against the deflection torque of the leaf spring 19 during the toasting operation and thus to allow the leaf spring 19 to bias the pivoted lever 7 in a clockwise direction and to hold the bimetallic strip 6 against the surface of the bread slice. At the termination of the toasting operation, however, the aforementioned force urging the leaf spring 19 downwardly is sufficient to overcome the overcenter spring 25 and effect opening of the switch 21. It will be noted further that when the switch 21 is open, as in Fig. 1, the pivoted lever 7 remains in its counterclockwise position regardless of the position of the cam 16 and the temperature-testing mechanism is therefore out of the way of the bread slice.

The operation of my automatic toaster is as follows. Before the initiation of the toasting operation, the various parts occupy the positions generally shown in Fig. 1. To start the toaster in operation the switch 21 is closed by moving it overcenter to the closed position shown in Fig. 2. This switch may be closed in any conventional manner, for example, manually; and the particular means for effecting closing forms no part of my invention. The closing of the switch 21 effects energization of the electric heating elements and of the motor 15. At the time of closing of the switch 21, or prior thereto, the bread slices are moved from an upper position, shown in Fig. 6, to a lower position where they are completely disposed between the electric heating elements 2, shown in Fig. 1. The manner of shifting the bread slices also forms no part of my invention and has not been illustrated. It may, for example, be accomplished manually, if desired. The motor 15 drives the cam 16 in a counterclockwise direction. Assuming that the temperature-testing means is in its retracted position when the switch 21 is closed, then as the cam 16 rotates to allow the follower 18 to move downwardly, the leaf spring 19 moves the temperature-testing means, including the pivoted lever 7, in a clockwise direction about the pivot 8. This moves the temperature-responsive element 6 against the surface of the bread.

The continued rotation of the cam 16 causes the cam follower 18 to be moved upwardly to the position shown in Fig. 4, thereby rotating the pivoted lever 7 counterclockwise and causing the temperature-responsive element 6 to be moved away from the bread to the position illustrated in Fig. 4. However, this rotation requires sufficient time, hence, the temperature-responsive element remains in engagement with the surface of the bread slice for a sufficient period to reach approximately the temperature of this surface. It thereby accurately senses the temperature of the bread surface and therefore also the color of the toast at that time. The aforementioned counterclockwise movement of the pivoted lever 7 is accomplished against the bias of the leaf spring 19. During such return movement of the temperature-responsive element from its bread-engaging position, it can be seen, by comparison of Figs. 2 and 4, that the upper end of the leaf spring 19 passes over the opening 33, as described above. As the rotation of the cam 16 continues, the cam follower 18 is again allowed to move downwardly, causing a movement of the pivoted lever 7 in a clockwise direction under the influence of the bias of the leaf spring 19. This in turn allows the temperature-sensitive element 6 to move again from the position shown in Fig. 4 to the bread slice engaging position shown in Fig. 2.

The above periodic oscillation of the temperature-testing means continues until the temperature of the bread surface reaches the desired value. When the temperature-responsive element 6 corresponds in temperature to the predetermined temperature of the bread surface after having been in contact therewith, it finally assumes the position shown in Fig. 3 wherein the end of the leg 34 projects through the opening 33 into the path of the upper end of the leaf spring 19. During the next subsequent movement of the temperature-responsive element 6 from its bread-engaging position, the relative movement of the members 19 and 29 normally taking place is prevented by the blocking of the upper end of the member 19 by the leg 34. Continued counterclockwise rotation of the temperature-testing means under the force exerted by the cam 16 against the cam follower 18 then causes a downward movement of the leaf spring 19. Since the leaf spring 19 is mounted on the switch arm 24, this continued downward movement eventually moves the switch arm 24 overcenter, opening the switch 21, and terminating the toasting operation. This same downward movement may also be employed to effect return of the carriage to its upper position in any suitable manner (not shown).

In Figs. 6, 7, 8 and 9 there is shown a modified form of my invention which includes a different arrangement for periodically moving the temperature-testing mechanism into and out of its bread engaging position. In this modified form of my invention the periodic oscillation of the temperature-testing mechanism 5', corresponding to the mechanism 5 in the form previously described, is accomplished by means of a mechanism which includes a heat expansible means or "hot wire" 35. In the form illustrated, this heat expansible means is connected in series with the electric heating elements 2, as illustrated in Fig. 8. Alternatively, any other suitable means of energizing the heat expansible means 35 may be provided.

The upper ends of the "hot wire" loop 35, which are generally indicated at 36, are supported in any suitable manner from a bracket 37 which forms part of the toaster structure. The lower end of the wire loop extends around a bight 38, which provides a cradle or support for a depending rod 39.

The heat expansible means 35 is arranged to control, for oscillating movement, a pivoted arm or member 40. The pivoted arm 40 is pivotally mounted at 41 on a bracket 42, which depends from the support 10. A spring 43 is positioned between the support 10 and the pivoted arm 40, one end of the spring bearing against the support 10 and the other end bearing against the pivoted arm, thereby biasing the arm downwardly in a counterclockwise direction about the pivot 41. A nut 44, or other suitable element, is secured to the lower end of the rod 39 for adjusting the downward or counterclockwise movement of the pivoted arm 40 under the bias of the spring 43.

In the normal or de-energized condition of the heat expansible means 35, the elongated "hot wire" comprising this heat expansible means assumes its contracted condition, thereby exerting an upward force on the bight 38 and the rod 39 depending therefrom. This holds the pivoted arm 40 in the position shown in Fig. 6 against the bias of the spring 43. When the heat expansible means 35 is energized, its temperature is raised and the wire elongates. This allows the pivoted arm 40 to move downwardly in a counterclockwise direction to the position shown in Fig. 7.

In this modified form of my invention a block or member 45 is mounted on one end of a pivoted lever 7', which corresponds to the lever 7 in the form shown in Figs. 1–5. This member 45 is formed to include a shoulder 46 positioned so as to be engageable by the free end 47 of the pivoted arm 40.

Figure 6:
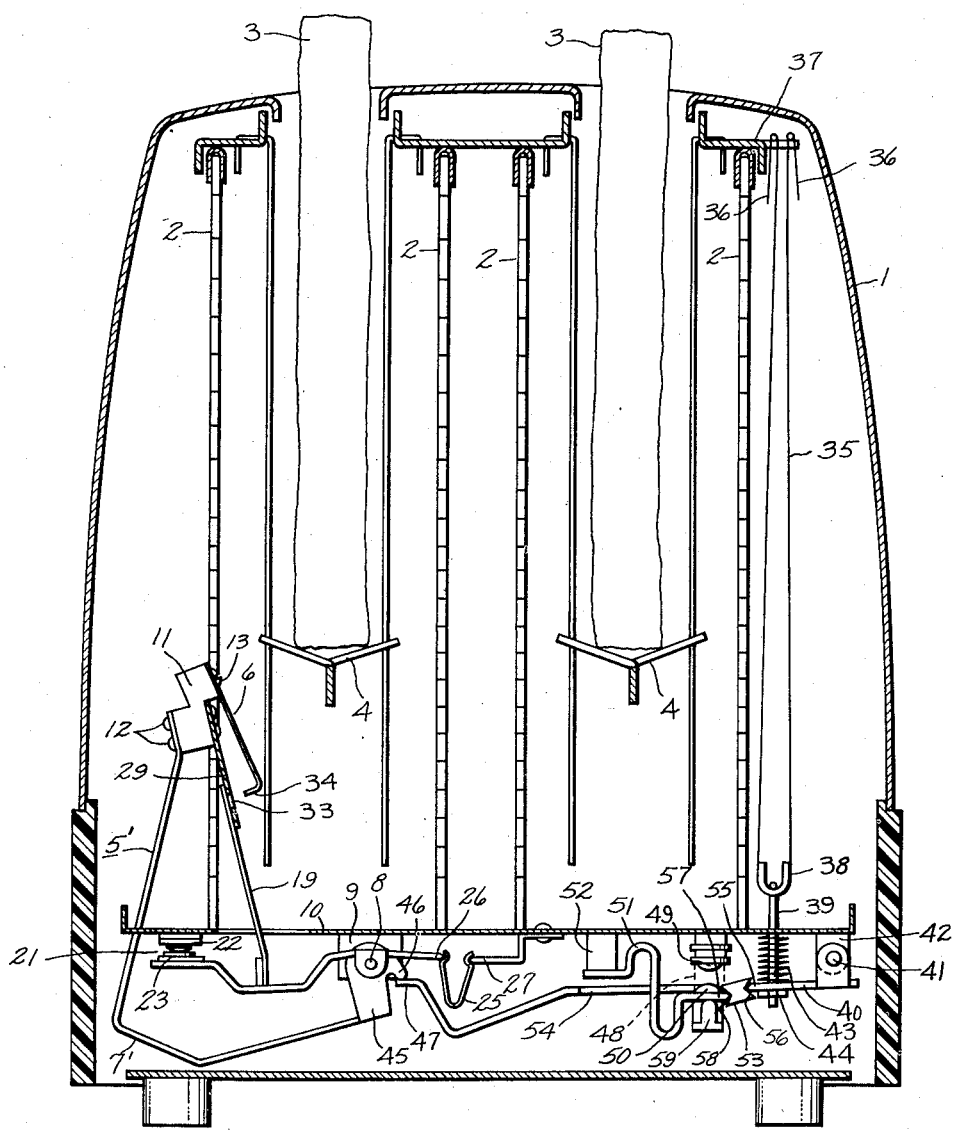
Fig. 6 shows a portion of a toaster illustrating a modified form of my invention.

By reference to Figs. 6 and 7 it will be apparent that when the pivoted arm 40 occupies its upper position, as illustrated in Fig. 6, it presses against the shoulder 46, and thereby urges the pivoted lever 7' into the counterclockwise position shown in Fig. 6 against the bias of the leaf spring 19. Conversely, when the pivoted arm 40 occupies the position shown in Fig. 7, it permits the pivoted lever 7' to move under the influence of the biasing leaf spring 19 to the position shown in Fig. 7, wherein the temperature-responsive element 6 is positioned in temperature-sensing relationship against the surface of the bread slice.

Figure 9:
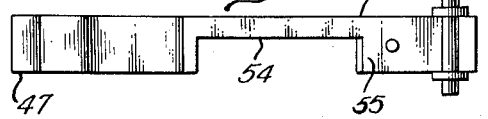
Fig. 9 is a plan view of one of the parts.

In order to effect the energization of the heat-expansible means 35, a switch 48 is arranged in parallel therewith, as illustrated in the schematic diagram shown in Fig. 8. The switch 48 includes a stationary contact 49 mounted by suitable insulating means on the support 10 and a movable contact 50 mounted on an S-spring 51. This spring 51 is supported on an insulating block 52 mounted on the support 10. In order to provide for snap-action operation of the switch 48 a ceramic toggle element 53 is employed. The pivoted arm 40, a plan view of which is shown in Fig. 9, is formed to include an opening, generally indicated at 54, within which the toggle element 53 is received and through which a portion of the switch 48 extends. A knife edge 55 is formed at one edge of the opening 54 in the pivoted arm 40, and this knife edge engages a V-notch 56 in one side of the toggle element 53. The S-spring 51 is formed to include a knife edge 57 at one end thereof and this knife edge engages a second V-notch 58 in the toggle element 53.

When the switch 48 is in its open position, as illustrated in Fig. 6, current may be supplied to the heat-expansible means 35, causing an elongation thereof and a downward, or counterclockwise, movement of the pivoted arm 40. When the heat-expansible means 35 has expanded sufficiently, the knife edge 55 is caused to move overcenter, effecting a snap-action movement of the movable contact 50 from a stop 59 to the stationary contact 49, thereby closing the switch 48 and shorting the heat-expansible means 35. At this time the pivoted arm 40 has moved downwardly to the position illustrated in Fig. 7, where, as pointed out previously, it permits the pivoted lever 7' to move under the influence of the biasing leaf spring 19 to a position wherein the temperature-responsive element 6 is positioned in temperature-sensing relationship against the surface of the bread slice.

The shorting of the heat-expansible means 35 results in a cooling and contraction of the heat-expansible means. This exerts an upward force on the rod 39 and the nut 44, thereby raising the pivoted arm 40 and ultimately bringing the end 47 thereof into engagement with the shoulder 46 of the member 45. This causes the temperature-testing mechanism to be returned to the position shown in Fig. 6 wherein the temperature-responsive element is out of engagement with the surface of the bread slice. Further, the upward movement of the pivoted arm 40 ultimately brings the knife edge 55 to an overcenter position which causes an overcenter movement of the toggle 53 and a snap-action movement of the movable contact 50 against the stop 59, opening the switch 48 and again energizing the heat-expansible means 35.

It can be seen that the periodic energization and de-energization of the heat-expansible means 35 through the snap-action opening and closing of the switch 48 effects a periodic oscillation of the temperature-testing mechanism 5' between the retracted position shown in Fig. 6 and the bread engaging position shown in Fig. 7. The operation of the toaster is otherwise the same as in the form of invention previously described in connection with Figs. 1 through 5 inclusive.

While I have shown and described specific embodiments of my invention, I do not desire my invention to be limited to the particular constructions shown and described and I intend by the appended claims to cover all modifications within the spirit and scope of my invention.

What I claim as new and desire to secure by Letters Patent of the United States is:

1. In a food cooking device or the like, electrical heating means, means for holding a food article to be cooked in heating relationship with said heating means, temperature-testing means for periodically engaging the surface of said food article, means for effecting periodic movement of said temperature-testing means into and out of engagement with said food article, and means actuated by said temperature-testing means during movement of said temperature-testing means out of engagement with said food article after having been in engagement therewith for de-energizing said heating means when the surface of said food article reaches a predetermined temperature.

2. In a toaster or the like, electrical heating means, means for holding a bread slice in toasting relationship with said heating means, temperature-testing means for periodically engaging the surface of the bread slice, means for effecting periodic movement of said temperature-testing means between a bread slice engaging position and a retracted position, and means actuated by said temperature-testing means during movement of said temperature-testing means out of engagement with said food article after having been in engagement therewith for de-energizing said heating means when the surface of said bread slice reaches a predetermined temperature.

3. In a toaster or the like, electrical heating means, means for holding a bread slice in toasting relationship with said heating means, temperature-testing means for periodically engaging the surface of the bread slice, a cam arranged to engage said temperature-testing means, means for driving said cam to cause periodic movement of said temperature-testing means between a bread slice engaging position and a retracted position, and means actuated by said temperature-testing means during movement of said temperature-testing means out of engagement with said food article after having been in engagement therewith for deenergizing said heating means when the surface of said bread slice reaches a predetermined temperature.

4. In a toaster or the like, electrical heating means, means for holding a bread slice in toasting relationship with said heating means, a temperature-responsive element periodcially movable into and out of engagement with the bread slice, means including a cam arranged for effecting the periodic movement of said temperature-responsive element, a switch for controlling the energization of said heating means, and an actuating member mounted on said switch and extending to a point adjacent said temperature-responsive element, said temperature-responsive element engaging said actuating member during movement of said temperature-responsive element out of engagement with the bread slice after the surface of the bread slice has reached a predetermined temperature for opening said switch to de-energize said heating means.

5. In a toaster or the like, electrical heating means, means for holding a bread slice in toasting relationship with said heating means, a member movable toward and away from the bread slice, a bimetallic element mounted on said member and periodically brought by said member into engagement with the bread slice, said bimetallic element being held in engagement with the bread slice a sufficient length of time to be heated approximately to the temperature of the bread slice, means including a cam for effecting periodic actuation of said member, a switch for controlling the flow of current to said heating means, and means engaged by said bimetallic element during movement of said member away from said bread slice after said bimetallic element has reached a predetermined temperature for opening said switch to de-energize said heating means.

6. In a toaster or the like, electrical heating means, means for holding a bread slice in toasting relationship with said heating means, a temperature-responsive element, means for bringing said temperature-responsive element periodically into engagement with the bread slice to measure the surface temperature thereof, said last-named means including a pivoted lever, a cam arranged to engage said pivoted lever, means for driving said cam to cause periodic movement of said lever, a switch for controlling the flow of current to said heating means, and means engaged by said element during movement of said pivoted lever away from said bread slice after said element has reached a predetermined temperature for opening said switch to de-energize said heating means.

7. In a toaster or the like, a support, electrical heating means mounted on said support, means for holding a bread slice in toasting relationship with said heating means, a pivoted lever, a temperature-responsive element mounted on said pivoted lever for sensing the temperature of the surface of the bread slice, a cam arranged to engage said pivoted lever, means for driving said cam to cause periodic movement of said lever for bringing said temperature-responsive element periodically into engagement with the surface of the bread slice to sense the temperature of the bread slice, and means engaged by said temperature-responsive element during movement of said pivoted lever away from the bread slice engaging position after said element has reached a predetermined temperature for de-energizing said heating means.

8. In a toaster or the like, electrical heating means, means for holding a bread slice in toasting relationship with said heating means, temperature-testing means for periodically engaging the surface of said bread slice, heat expansible means, a member operated by said heat expansible means and engaging said temperature-testing means for periodically causing said temperature-testing means to be moved into bread slice engaging position, and means actuated by said temperature-testing means during movement of said temperature-testing means out of engagement with said food article after having been in engagement therewith for de-energizing said heating means when the surface of the bread slice reaches a predetermined temperature.

9. In a toaster or the like, electrical heating means, means for holding a bread slice in toasting relationship with said heating means, a temperature-responsive element movable into and out of engagement with the bread slice, heat expansible means for controlling the movement of said element, a switch for controlling the energization of said heating means, an actuating member mounted on said switch and extending to a point adjacent said temperature-responsive element, said temperature-responsive element engaging said actuating member during movement of said temperature-responsive element out of engagement with the bread slice after the surface of the bread slice has reached a predetermined temperature for opening said switch to de-energize said heating means.

10. In a toaster or the like, electrical heating means, means for holding a bread slice in toasting relationship with said heating means, a member movable toward and away from the bread slice, a bimetallic element mounted on said member and periodically brought by said member into engagement with the bread slice, said bimetallic element being held in engagement with the bread slice a sufficient length of time to be heated approximately to the temperature of the bread slice, heat expansible means for controlling the actuation of said member, a switch for controlling the energization of said heating means, and means engaged by said bimetallic element during movement of said member away from said bread slice after said bimetallic element has reached a predetermined temperature for opening said switch to de-energize said heating means.

11. In a toaster or the like, electrical heating means, means for holding a bread slice in toasting relationship with said heating means, a first switch for controlling the flow of current to said heating means, a temperature-responsive element, means for bringing said temperature-responsive element periodically into engagement with the bread slice to measure the surface temperature thereof, said last-named means including a pivoted arm, heat expansible means operatively connected to said pivoted arm for moving it to effect a periodic movement of said temperature-responsive element between a bread slice engaging position and a retracted position, a second switch for controlling energization of said heat expansible means, and means engaged by said temperature-responsive element during movement of said element away from the bread slice after the surface temperature of the bread slice reaches a predetermined value for actuating said first switch to cause de-energization of said heating means.

12. In a toaster or the like, electrical heating means, means for holding a bread slice in toasting relationship with said heating means, a pivoted lever, a temperature-responsive element mounted on said pivoted lever, means for periodically oscillating said lever to bring said temperature-responsive element into engagement with the bread slice, an elongated member arranged for relative longitudinal movement with respect to said temperature-responsive element during said periodic oscillation, said temperature-responsive element upon attaining a predetermined temperature moving into the path of said elongated member and blocking said relative movement of said elongated member during movement of said lever away from the bread slice, and means operative when said relative movement of said elongated member is blocked and said lever is moved away from the bread slice for terminating the toasting operation.

13. In a toaster or the like, electrical heating means, means for holding a bread slice in toasting relationship with said heating means, a pivoted lever, a temperature-responsive element mounted on said pivoted lever, means for periodically oscillating said lever to bring said temperature-responsive element into engagement with the bread slice, a switch for controlling the energization of said heating means, said switch including a pivoted switch arm, an elongated member arranged for relative longitudinal movement with respect to said temperature-responsive element during said periodic oscillation, said elongated member being mounted on said switch arm, said temperature-responsive element upon attaining a predetermined temperature moving into the path of said elongated member and blocking said relative movement of said elongated member during movement of said lever away from the bread slice whereby said element moves said elongated member and said switch arm to thereby actuate said switch to de-energize said heating means.

14. In a toaster or the like, electrical heating means, means for holding a bread slice in toasting relationship with said heating means, a pivoted lever, a member mounted on one end of said pivoted lever, said member having an opening therein, a bimetallic element mounted on said lever adjacent said member, said element including a tongue arranged in alignment with said opening, means for periodically moving said lever to bring said bimetallic element into engagement with the bread slice, an elongated member arranged to move past said opening on the side of said member opposite said bimetallic element during movement of said lever away from the bread slice, said tongue moving through said opening into the path of said elongated member when the temperature of the bread slice reaches a predetermined value, said tongue thereby blocking movement of said elongated member past said opening during the movement of said lever away from the bread slice, and means dependent upon the blocking of the movement of said elongated member for terminating the toasting operation.

15. In a toaster or the like, a support, electrical heating means, means for holding a bread slice in toasting relationship with said heating means, a pivoted lever mounted on said support, a bimetallic element mounted on one end of said pivoted lever, a switch arm pivotally connected to said support, means for periodically moving said lever to bring said bimetallic element into engagement with the bread slice for sensing the temperature of the surface of the bread slice, said bimetallic element including a tongue on the free end thereof, an elongated member mounted on said switch arm and having a free end extending into the region of said free end of said bimetallic element, said elongated member being arranged for relative longitudinal movement with respect to said bimetallic element during the periodic movement of said lever, said tongue engaging the free end of said elongated member during movement of said bimetallic element away from the bread slice after the surface of the bread slice has reached a predetermined temperature, said tongue thereby blocking movement of said elongated member relative to said bimetallic element during said movement of said bimetallic element away from the bread slice whereby said elongated member is caused to actuate said switch arm resulting in de-energization of said heating means.

16. In a toaster or the like, a support, electrical heating means mounted on said support, means for holding a bread slice in toasting relation with said heating means, a pivoted lever, temperature-responsive means on said pivoted lever for sensing the temperature of the surface of the bread slice, heat expansible means, a switch arm mounted on said support and connected to said heat expansible means, the free end of said switch arm being arranged to engage said lever for effecting movement of said lever to bring said temperature-responsive means periodically into engagement with the surface of the bread slice for sensing the temperature of the bread slice, said switch arm controlling the energization and de-energization of said heat expansible means for periodically heating and cooling said heat expansible means to secure periodic oscillation of said switch arm, and means actuated by said temperature-responsive means during movement of said temperature-responsive means away from the bread slice after the surface of the bread slice has reached a predetermined temperature for de-energizing said heating means.

17. In a toaster or the like, a support, electrical heating means, means for holding a bread slice in toasting relationship with said heating means, a lever pivotally mounted on said support, a member mounted on said lever, said member having an opening therein, a bimetallic element mounted on said lever adjacent said member, said element including a tongue arranged in alignment with said opening, means for moving said lever to bring said bimetallic element periodically into engagement with the surface of the bread slice for sensing the temperature of the bread slice, a switch for controlling the energization of said heating means, said switch including a pivoted arm, and an elongated member mounted on said switch arm and arranged normally for relative movement past said opening on the side of said member away from said bimetallic element during movement of said lever away from the bread slice, said tongue moving through said opening into the path of said elongated member when the surface of the bread slice reaches a predetermined temperature, said tongue thereby blocking the movement of said elongated member past said opening during movement of said lever away from the bread slice, whereby the blocking action of said tongue causes movement of said elongated member to actuate said switch arm for de-energizing said heating means.

References Cited in the file of this patent

UNITED STATES PATENTS

| | | |
|---|---|---|
| 1,687,680 | Matthews | Oct. 16, 1928 |
| 2,132,622 | Ireland | Oct. 7, 1938 |
| 2,159,658 | Hall | May 23, 1939 |
| 2,179,422 | Myers | Nov. 7, 1939 |